M. E. N. LUDLOW.
WIND SHIELD ATTACHMENT.
APPLICATION FILED FEB. 21, 1916.
1,215,174. Patented Feb. 6, 1917.
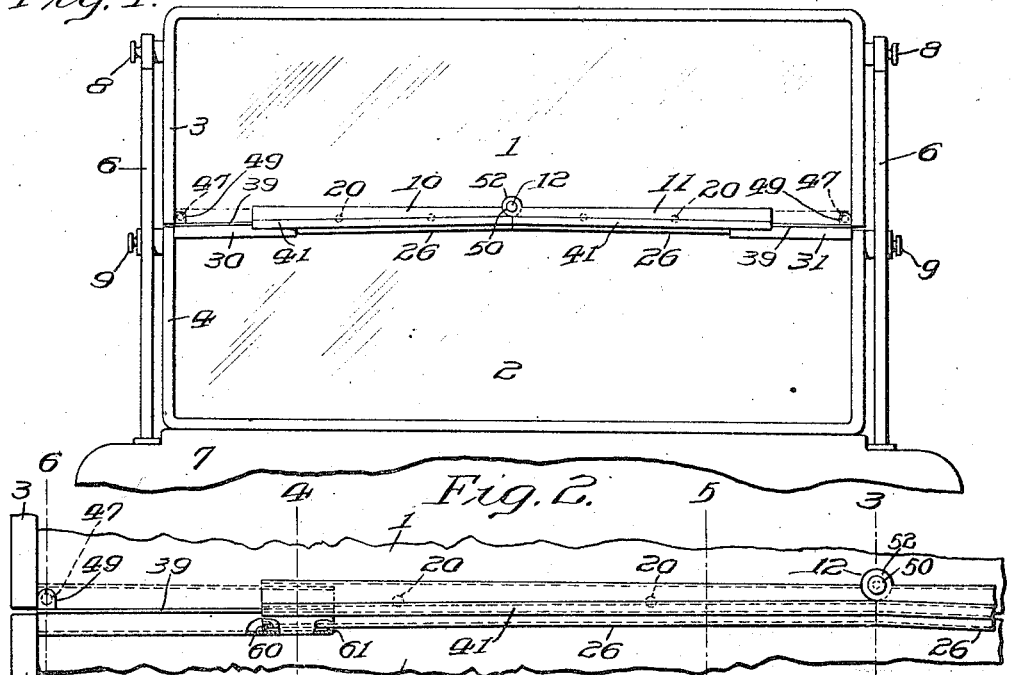
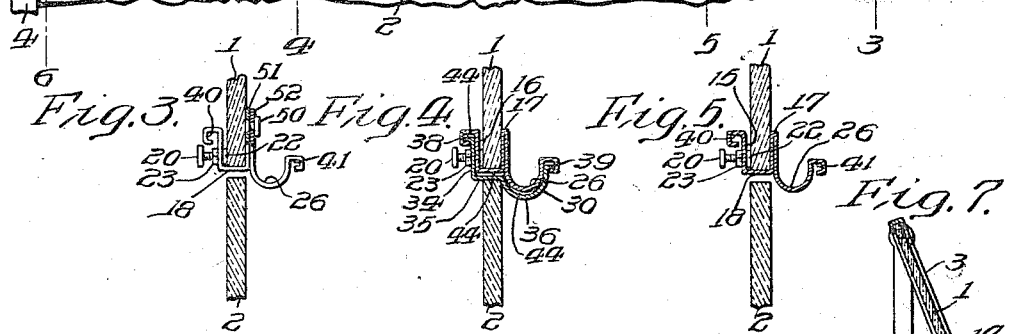
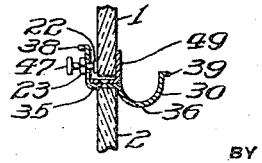
INVENTOR
Margery E. N. Ludlow.
WITNESS
F. J. Hartman
BY
ATTORNEYS

UNITED STATES PATENT OFFICE.

MARGERY E. N. LUDLOW, OF HAVERFORD, PENNSYLVANIA.

WIND-SHIELD ATTACHMENT.

1,215,174.     Specification of Letters Patent.     Patented Feb. 6, 1917.

Application filed February 21, 1916. Serial No. 79,604.

*To all whom it may concern:*

Be it known that I, MARGERY E. N. LUDLOW, a citizen of the United States, and a resident of Haverford, in the county of Montgomery, State of Pennsylvania, have invented a certain new and useful Wind-Shield Attachment, of which the following is a specification, reference being had to the accompanying drawing.

My invention relates to wind shields for automobiles and the like, and a principal object thereof is to provide means for collecting and carrying off the moisture or rain which accumulates upon the upper portion of a wind shield during foggy or rainy weather, and thereafter runs down and collects in large drops adjacent the lower edge of the upper portion of the shield and from whence it is carried back into the body of the car by the force of the wind or the jolting of the vehicle.

A further object of my invention is to provide means adapted for the purpose intended which may be readily applied to or removed from a wind shield of the usual form; which may be readily adjusted to conform to the varying widths of different wind shields and which may be removed from the shield and compactly folded when desired. Still further objects of my invention are to provide a device having the foregoing characteristics which shall be inexpensive to manufacture and which may be sold at a relatively low price; which shall be light in weight; which will not detract from the appearance of a wind shield to which it may be attached, and which shall serve to prevent the passage of air through the space between the adjacent edges of the two portions of the wind shield when the latter are adjusted in normal position, that is when both portions of the shield are disposed in substantially the same plane.

My invention further includes all of the other various novel objects and features of construction and arrangement hereinafter more definitely specified and described.

In the accompanying drawing in which is illustrated a preferred embodiment of my invention, Figure 1 is a front elevation of a wind shield in normal position with the invention positioned thereon; Fig. 2 an enlarged fragmentary elevation of the invention showing the same in position on the wind shield, certain portions being broken away for the sake of clearness; Fig. 3 a transverse vertical section taken on line 3—3 in Fig. 2; and Figs. 4, 5, and 6, views similar to Fig. 3, taken respectively on lines 4—4, 5—5, and 6—6 in Fig. 2. Fig. 7 is a transverse vertical section through a wind shield showing the invention positioned thereon, the upper portion of the shield being in inclined or "rain-vision" position, and Fig. 8 is a front elevation of the invention showing the same removed from the wind shield and with the parts folded for storage or transportation.

In the drawings the invention is shown in Figs. 1 to 7 inclusive as attached to a wind shield of the usual form which may comprise upper and lower glasses 1 and 2, set in suitable frames 3 and 4 in turn pivoted to uprights 6 rigid with the vehicle body 7 by pivots 8 and 9 whereby the glasses may be angularly adjusted with respect to the uprights, and to each other, in the usual manner. The form of the invention illustrated may comprise a pair of longitudinally extended substantially similar body members 10 and 11 hinged together by means of a suitable hinge 12 hereinafter more specifically described, the body members being formed preferably of sheet metal and each providing a channel 15, having side walls 16 and 17 and a bottom wall 18, the width of the channel being preferably somewhat in excess of the thickness of the glass 1 so that the glass may be readily engaged within the channel. For the purpose of securing the body portions 10 and 11 in adjustably fixed relation with the glass 1, any suitable means may be employed, those shown in the drawing comprising a plurality of thumb screws 20 extending through suitably threaded apertures in the rear wall 16 of each body member and engaging either directly against the glass 1 or against suitable preferably slightly resilient washers 22 preferably secured to the ends of the thumb screws which in turn engage against the glass, lock nuts 23 serving to hold the thumb screws fixedly in adjusted position. If desired, however, instead of utilizing the washers 22, the ends of the thumb screws may be tipped with rubber or other slightly resilient material to engage against the glass.

For the purpose of collecting and carrying off the moisture or rain which collects on the glass 1 above each of the body members 10 and 11, a longitudinally extending gutter is formed adjacent to and preferably somewhat below and in front of wall 17 of each member and while this gutter may, if desired, be formed separately from the channel portion of the member and suitably secured thereto by solder or in any other convenient manner, I prefer to form the same integrally therewith by carrying the metal of which the latter is made downwardly from the upper extremity of wall 17 and adjacent thereto for a suitable distance and then curving the same outwardly and upwardly to form a substantially semi-circular gutter 26 extending for the full length of each member the bottom of the gutter being preferably disposed below the bottom wall 18 of the channel. Instead, however, of forming the bottom of the gutter parallel with the upper edge of the wall 17 and hence with the lower edge of the glass 1 when the device is in adjusted position thereon, I preferably slant each gutter slightly downwardly and outwardly, as clearly shown in Figs. 1 and 2, so that adjacent the hinge 12 the bottom of each gutter will be slightly closer to the upper edge of the wall 17 of its respective body member than adjacent the outer extremity thereof. Thus any water collecting in each gutter will tend to run off toward that side of the vehicle toward which that gutter is inclined.

For the purpose of facilitating the attachment of the invention to wind shields of varying width I prefer to provide means whereby the over-all length of the device may be readily varied, and for this purpose I provide adjacent the outer extremity of each of the body members 10 and 11, other somewhat similar members 30 and 31, each suitably arranged for slidable adjustment with respect to the body member to which it is attached. Each of the sliding members 30 and 31 is, like the body members, preferably composed of a single piece of sheet metal and comprises a vertically extending portion 34 adjacent wall 16, a horizontally extending portion 35 adjacent and preferably beneath bottom wall 18, and a curved portion or gutter 36 adjacent and preferably beneath gutter 26. For the purpose of supporting each sliding member upon its respective body member in such manner as to permit of longitudinal adjustment with respect thereto, I direct the upper edges of the portion 34 and of the gutter 36 substantially horizontally outward to form flanges 38 and 39 operative to engage within grooves 40 and 41 on the body member, said grooves being preferably formed by turning over the metal composing the latter adjacent the upper extremity of wall 16 and the upper extremity of the gutter 26, as clearly shown in Figs, 3 and 5. It will be evident that each sliding member will thus be supported by the engagement of its flanges 38 and 39 in grooves 40 and 41, and may be slid longitudinally of the body member to assume any position with respect thereto, within limits, which may be desired, slight clearances 44 serving to prevent binding between the adjacent surfaces during the relative movement of the parts, which binding might otherwise occur on account of the inclination of the gutters 26 and 36, it being understood that the latter gutters are each preferably slightly inclined downwardly and outwardly in a manner similar to that previously described in connection with gutters 26, so that when the sliding members are extended beyond the body members, each gutter 36 will form a continuation of its adjacent gutter 26. If desired, each of the members 30 and 31 may be provided with one or more thumb screws 47 similar to thumb screws 20 for the purpose of securing the respective members to the glass 1, when the invention is positioned thereon, and I prefer to provide a suitable lug 49 opposite each thumb screw 47 arranged to engage against the front of the glass to prevent the member 30 or 31, as the case may be, from being forced out of alinement when the thumb screw is tightened. The lugs may be formed separately and secured in position by a suitable nut or by solder, or may, if desired, be formed integrally with members 30 and 31.

While the hinge 12, previously referred to, may be of any suitable form to permit either of the body members 10 or 11 to be moved substantially through an arc of 180 degrees with respect to the other member when the invention is removed from the wind shield to assume the folded position shown in Fig. 8, that form of hinge shown in the drawings comprises a suitable stud 50 passing through suitably off-set substantially circular lugs 51 and 52 preferably joined integrally with the walls 17 of the body members, the axis of the stud being preferably in substantial alinement with the upper edges of the walls 17 when the body members are in extended position so that said edges may be brought into substantial engagement when the device is folded. For certain constructions however, it may be found desirable to omit the hinged joint between the body members entirely, and to form the latter as a single integral member.

For the purpose of preventing the sliding members 30 and 31 from being accidentally disengaged from the members 10 and 11, suitable means may preferably be provided, a convenient manner of accomplishing the desired result being to bend the metal forming the bottom of each gutter 26 downwardly adjacent its outer extremity to form a stop 60, and to correspondingly bend the metal forming the bottom of the gutter 36 upwardly adjacent its inner extremity to form a stop 61 after each sliding member is assembled upon its respective body member, so that the engagement of stop 61 with stop 60 when each sliding member is drawn outwardly with respect to its adjacent member will serve to prevent complete removal of the sliding member therefrom.

The parts having been constructed and assembled preferably substantially as described, the invention may be adjusted in operative position upon a wind shield by engaging the lower edge of the glass 1 in the channels 15, the body members 10 and 11 having been revolved or opened out to substantial horizontal alinement, the hinge 12 being positioned preferably about equidistantly between the lateral extremities of the glass. The sliding members 30 and 31 may now be moved outwardly sufficiently far to bring their outer extremities into engagement, or substantial engagement, with the frame 3 surrounding the glass and the whole device then secured in position by means of the thumb screws 20 and 47, the lock nuts 23 being thereafter adjusted to prevent the thumb screws from becoming accidentally loosened.

With the invention so adjusted in operative position any moisture accumulating on the glass 1 and running toward the lower edge thereof will be collected in the gutters 26 and 36 and carried off toward the sides of the shield, thus preventing its being blown or jarred back into the body of the vehicle through the space between the lower edge of glass 1 and the upper edge of glass 2 when the former is swung outwardly as shown in Fig. 6 for the purpose of affording an opening between the two glasses through which the operator of the vehicle may look when driving through rain or fog. Furthermore, when the upper glass is swung down into normal position, that is, substantially into the plane of the lower glass, the invention will cover the narrow opening between the adjacent edges of the glass and prevent any air passing therethrough. The thinness of the metal of which the device is made, however, readily permits of the passage of portions 18 and 35 through this narrow space between the adjacent edges of the wind shield glasses, and the invention therefore in no way interferes with or hinders the relative adjustment of the glasses in the ordinary manner when desired.

Moreover, it will be evident that by a suitable adjustment of the portions 30 and 31, the invention may be adapted for use on wind shields of varying widths and that after the same has been placed in position upon any given shield it may be readily removed therefrom whenever desired by unscrewing the thumb screws and that when removed from operative position the sliding members may be pushed toward the hinge as far as they will go and the body members folded together to assume the position shown in Fig. 8 to permit of the invention being stored in a relatively small space, as in the tool box, or other convenient receptacle upon the vehicle in connection with which the invention is to be used.

While I have herein illustrated and described a preferred embodiment of my invention with considerable particularity, I do not desire or intend to thereby limit myself specifically thereto, as suitable changes and modifications may be made in the details thereof and in the construction and arrangement of the various parts when desired without departing from the spirit and scope of the invention as defined in the appended claims.

Having thus described my invention, I claim and desire to protect by Letters Patent of the United States:

1. In a device of the class described, a body member having a gutter and adapted for attachment adjacent the edge of a wind shield, a member slidable with respect to said body member and supported thereby and also having a gutter forming an extension of the gutter on said body member, and means to secure said members to a wind shield.

2. In a device of the class described, the combination with a body member having a gutter and a channel adapted to receive the edge of a wind shield glass, of a member slidable with respect to said body member and also having a gutter forming a continuation of the gutter of said body member, means operative to adjustably support said slidable member upon said body member, and means operative to secure the device to the edge of a wind shield.

3. In a device of the class described, the combination of a pair of hingedly connected body members each having a gutter, a member adjacent the outer end of each of said body members and also having a gutter, each of said last mentioned members being slidably adjustable with respect to said body members, and means for supporting said members adjacent the edge of a wind shield glass.

4. In a device of the class described, the combination of a pair of channeled hingedly connected body members each having a gutter inclined with respect to its longitudinal axis, an adjustable member adjacent that end of each body member removed from the hinge and also comprising a gutter operative to form a continuation of the gutter on the adjacent body member, and means operative to secure said members adjacent the edge of a wind shield glass.

5. In a device of the class described, the combination of a pair of body members each having a channel to receive the edge of a wind shield glass and a gutter inclined with respect to said channel, said body members being hinged together for relatively rotatable movement, means adapted to removably secure said members to a wind shield glass, a member also comprising an inclined gutter adjacent an end of each of said body members, and means operative to support each of said last mentioned members upon its adjacent body member to permit of its longitudinal adjustment with respect thereto.

6. A device of the class described comprising relatively movable members each having a gutter, means operative to secure said members to a wind shield, members slidable with respect to said first mentioned members and also comprising gutters arranged to form extensions of said first mentioned gutters, and means operative to adjustably telescopically support said last-mentioned members upon said first-mentioned members.

7. A device of the class described comprising a channel member having a gutter, a member relatively movable with respect thereto and also comprising a gutter, means operative to support said last-mentioned members upon said first-mentioned members with said gutters in alinement, and means operative to removably secure said members adjacent the edge of a wind shield glass.

In witness whereof, I have hereunto set my hand this 19th day of February, A. D. 1916.

MARGERY E. N. LUDLOW.